Feb. 10, 1942. J. G. ST. LAURENT 2,272,334
COMPACT VEHICLE WHEEL RAISING DEVICE
Filed Nov. 4, 1940
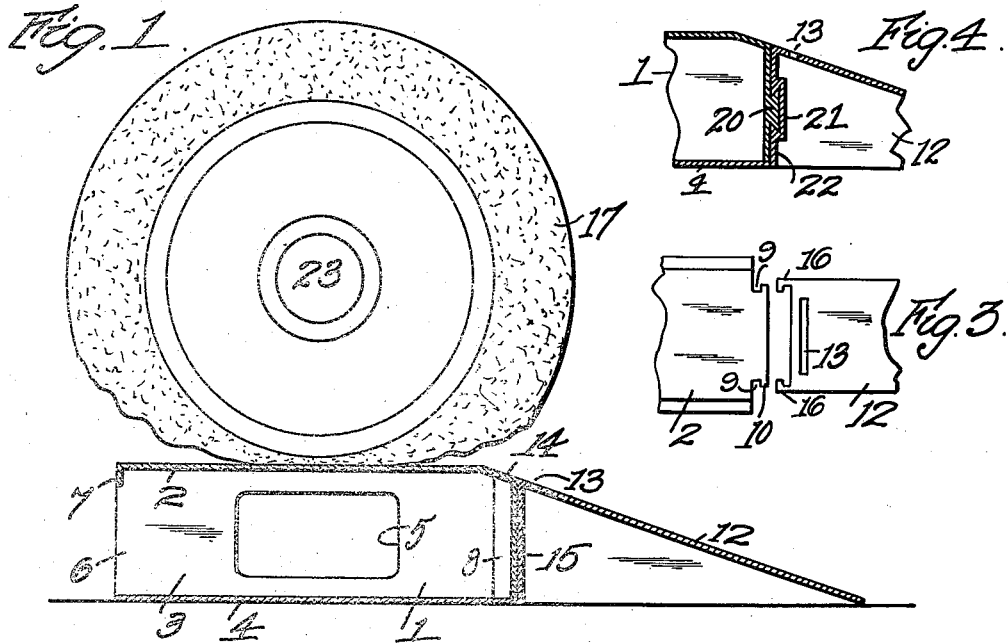
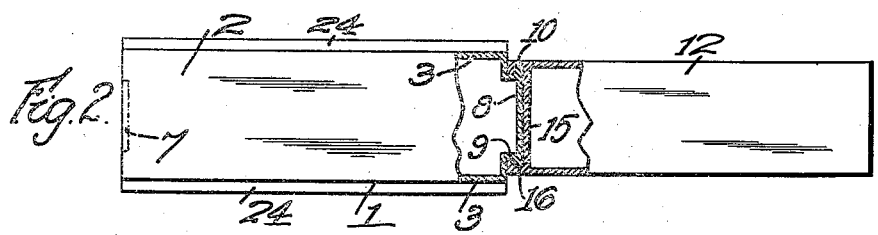
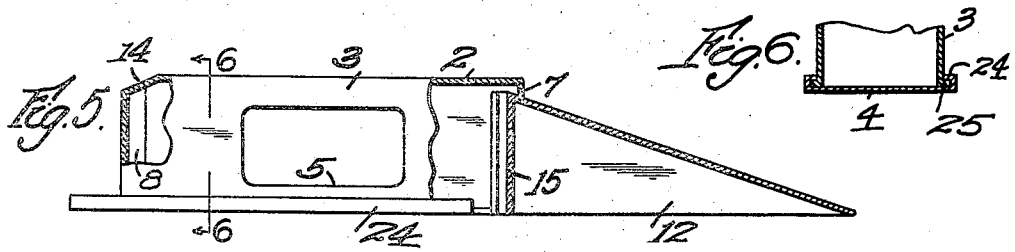
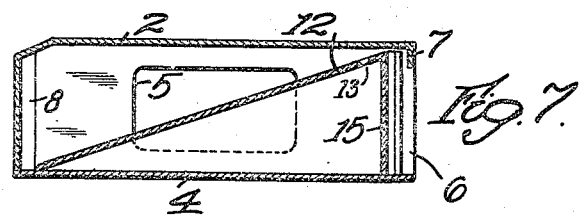
Inventor
John G. St. Laurent
By attorney
Charles R. Fay Patented Feb. 10, 1942

2,272,334

UNITED STATES PATENT OFFICE 2,272,334

COMPACT VEHICLE WHEEL RAISING DEVICE

John G. St. Laurent, Worcester, Mass.

Application November 4, 1940, Serial No. 364,250

8 Claims. (Cl. 254—88)

This invention relates to a compact emergency vehicle wheel raising device. Objects of the invention include the provision of a light weight ramp made of any suitable material for the purpose of quickly raising an automobile wheel for repair especially to a flat tire; the provision of such a device which is made in two mating parts, i. e., a block forming a platform and an attachable inclined ramp part, the latter being nestable in the former for storage in the vehicle itself for transportation and useful for a chock after the wheel is raised; and the provision of a small portable wheel raising device having an aperture thru which a jack may be correctly located to further raise the wheel, the device being capable of being stored in a small space in the vehicle whereby it may be carried about for emergency purposes.

Other objects and advantages of the invention will appear hereinafter.

Reference is to be had to the accompanying drawing, in which—

Fig. 1 is a sectional view of a device embodying the present invention, and showing a wheel in raised position;

Fig. 2 is a plan view of the device shown in Fig. 1, with parts in section;

Fig. 3 is a partial plan view showing the parts separated;

Fig. 4 is a partial sectional view of a modified attaching means;

Fig. 5 is a side elevation of a device having a modified attaching means with parts in section;

Fig. 6 is a section on line 6—6 of Fig. 5; and

Fig. 7 is a sectional view showing the parts in nested position for storage.

In Figs. 1 to 3, there is shown a rectangular hollow block 1 having a top 2, side walls 3, and a bottom 4. The side walls are apertured as at 5 for a purpose to be described. This block may be made of any desired or convenient material such as sheet metal, plastic, or wood, and may be stamped, cast, or forged. One end of the block may be open as at 6, and a transverse dependent lip 7 is formed on the top 2 at this end.

The opposite end of the block may be closed and is provided with a hollow extension 8 which is narrower than the block and has opposite exterior inset grooves 9 of any desired form. These grooves are arranged to provide short lips 10. Grooves 9 extend vertically as seen in Fig. 1, and constitute an attaching means for the inclined ramp part 12.

The ramp 12 may if desired be hollow or solid and is narrower than the block. At the top of the ramp, there is a transverse groove or slot 13. The closed end 15 is provided with extending side guides 16 for sliding reception in grooves 9, thus mating with lips 10 so that in the position shown in Fig. 1, the ramp part may be removed from block 1 only by an upward movement. Thus it will be clear that the block and the ramp are securely attached to run the wheel 17 up or down, but that the ramp is removable from the block.

In Fig. 4, there is shown a modified ramp and block attaching means, comprising a horizontal key 20 in the closed end of the block and a horizontal mating keyway 21 in the ramp end 22. With this construction the ramp may be slidably horizontally detached from the block even though the wheel is of relatively large diameter so that it overhangs the ramp and would prevent vertical withdrawal of the ramp.

The side wall apertures 5 are provided for the passage of a jack thru the block. Thus, in Fig. 1, the axle 23 of wheel 17 may be positioned directly over the apertures 5 and a jack may be passed thru the apertures and hence be substantially aligned with the axle so that it is easily set in position to raise the wheel sufficiently to separate a flat tire from the block.

The bottom 4 of the block 1 may take the form of a slidable cover having in-turned flanges 24 to slidingly cooperate with ribs 25 on the block. With this construction, the side walls 3 cannot tend to spread apart under the weight of the vehicle, and also the cover will provide a closure for the block to retain the ramp 12 therewithin in nested condition.

The lip 7 is arranged to be entered into the slot 13 to hold the parts in position as in Fig. 5, whereas the groove and rib construction at 9, 10 or 20, 21 may be used at the opposite end of the block, so that the ramp may be held to the block at either its open or closed end. The lip 7 also will provide an abutment to prevent the ramp from sliding out of the open end 6 of the block when the parts are nested.

It will be noted that the block is inclined at 14 at its closed end to mate with the ramp and form a continuous incline to the top 2, see Figs. 1 and 4. The small shoulder formed by lip 7 as shown in Fig. 5 will not interfere, however, with the rolling up of a vehicle wheel.

From the above, it will be seen that this invention provides a compact and convenient wheel raising device which can be stowed in a small space when not in use, and which is effective to raise a wheel so that a jack may be easily applied to the wheel axle without the necessity of the operator crawling in under the vehicle. When the wheel is raised, the ramp, which is attachable to either the open or closed end of the block, is removable for use as a chock to prevent accidental movement of the vehicle. The cover 4 allows for access to the block so that the ramp can be received therein, and also performs the function of preventing spreading of the side walls 3 under vertical pressure.

Having thus described my invention and the advantages thereof, I do not wish to be limited to the details herein disclosed, otherwise than as set forth in the claims, but what I claim is:

1. In a device of the class described, a block having an open side, an open end and an opposite end wall, an inclined ramp element having a wall at one end, and a dovetail interengaging rib and groove connection on said walls whereby said ramp element is slidingly attachable to said block at its end wall to form a vehicle wheel raising device, said ramp element and said block being selectively movable only in a single straight line for greater rigidity, and said ramp and block having closely merging supporting surfaces providing a continuous supporting contour.

2. A device as recited in claim 1 wherein the dovetail rib and groove connection is arranged vertically.

3. A device as recited in claim 1 wherein the dovetail rib and groove connection is arranged horizontally.

4. In a device of the class described, a hollow block having an open end and an opposite end wall, a rib and groove construction at said wall, said construction being narrower than said block, an inclined ramp having an end wall, said ramp being narrower and shorter than said block for storage therein, and a rib and groove construction on the end wall of said ramp for sliding cooperation with the rib and groove construction on the end wall of said block, whereby said block and ramp may be connected.

5. In a device of the class described, a hollow block having an open end, a lip on said block extending into said open end, an inclined ramp element having a slot for engagement with said lip to connect said block and said element in extended aligned condition, said element being receivable in said block, said lip forming an abutment to prevent egress of said element from said block thru the open end of the latter.

6. In a device of the class described, a hollow block having a closed end, an opposite open end and side walls, an inclined ramp slidably attachable to said block at said closed end, aligned apertures in said side walls for the admission of a jack thru the block to correct position under the axle of a wheel resting on the platform.

7. In a device of the class described, a hollow block having a closed end and top and side walls, and an open bottom, ribs extending outwardly from said side walls adjacent said bottom, a cover slidably arranged on said ribs to prevent spreading of said side walls when under the weight of a vehicle wheel, and an inclined ramp detachable from said block and leading up onto said top.

8. A device as recited in claim 7 wherein said ramp is receivable in said hollow block and is retained therein by said sliding cover when in closed condition.

JOHN G. ST. LAURENT.